US011773961B2

(12) United States Patent
Uhkötter et al.

(10) Patent No.: US 11,773,961 B2
(45) Date of Patent: Oct. 3, 2023

(54) PLANETARY GEAR BOX AND METHOD FOR OPERATING A PLANETARY GEAR BOX AND GAS TURBINE ENGINE HAVING AT LEAST TWO CENTRAL SHAFTS AND HAVING A PLANETARY GEAR BOX

(71) Applicant: Rolls-Royce Deutschland Ltd & Co KG, Blankenfelde-Mahlow (DE)

(72) Inventors: Stephan Uhkötter, Berlin (DE); Uwe Kracht, Berlin (DE); Jakob Violet, Nuthetal (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 17/897,619

(22) Filed: Aug. 29, 2022

(65) Prior Publication Data

US 2023/0069754 A1    Mar. 2, 2023

(30) Foreign Application Priority Data

Aug. 30, 2021  (DE) .......................... 102021122413.6

(51) Int. Cl.
 *F16H 57/08*  (2006.01)
 *F16H 57/04*  (2010.01)
 *F01D 15/12*  (2006.01)

(52) U.S. Cl.
 CPC ....... *F16H 57/0471* (2013.01); *F16H 57/043* (2013.01); *F16H 57/0404* (2013.01);
(Continued)

(58) Field of Classification Search
 CPC ...... F16H 57/08; F16H 57/082; F16H 57/085; F16H 57/0471; F16H 57/0404;
(Continued)

(56) References Cited

U.S. PATENT DOCUMENTS 5,391,125 A    2/1995  Turra et al.
2010/0317477 A1  12/2010  Sheridan et al.
(Continued)

FOREIGN PATENT DOCUMENTS

DE  102017008675 A1  3/2019
DE  102020204805 A1  2/2021
(Continued)

OTHER PUBLICATIONS

German Search Report dated Apr. 6, 2022 from counterpart German Patent Application No. 10 2021 122 413.6.

*Primary Examiner* — Lori Wu

(74) *Attorney, Agent, or Firm* — SHUTTLEWORTH & INGERSOLL, PLC; Timothy Klima

(57) ABSTRACT

A planetary gearbox of a gas turbine engine has a planet gear which, via a bearing, is arranged rotatably on a planet pin of a rotatable planet carrier. Oil is introduced through an opening, arranged radially within the bearing, into an oil feed which is open at a feed side and which is connected to the bearing and rotationally joined to the carrier. As the carrier rotates, the oil downstream of the opening is conducted toward the bearing unit by centrifugal force. The open oil feed is, between the opening and the bearing, configured an oil filter through which the oil is conducted. The filter extends counter to the flow direction of the oil from the opening in the direction of the bearing unit, in a flow direction of the oil in the open oil feed.

13 Claims, 7 Drawing Sheets

(52) U.S. Cl.
CPC ..... *F16H 57/0427* (2013.01); *F16H 57/0436* (2013.01); *F16H 57/08* (2013.01); *F01D 15/12* (2013.01); *F05D 2220/32* (2013.01); *F16H 2057/085* (2013.01)

(58) Field of Classification Search
CPC ............... F16H 57/0427; F16H 57/043; F16H 57/0436; F01D 15/12; F05D 2220/32
See application file for complete search history.

(56) References Cited

U.S. PATENT DOCUMENTS

| | | | |
|---|---|---|---|
| 2018/0187719 A1* | 7/2018 | Tulokas | .............. F16H 57/0479 |
| 2019/0085972 A1* | 3/2019 | Uhkoetter | ............... F01D 25/18 |

FOREIGN PATENT DOCUMENTS

| | | | |
|---|---|---|---|
| JP | 2005351294 A | 12/2005 |
| JP | 2013072545 A | 4/2013 |
| JP | 2020190314 A | 11/2020 |

* cited by examiner

PLANETARY GEAR BOX AND METHOD FOR OPERATING A PLANETARY GEAR BOX AND GAS TURBINE ENGINE HAVING AT LEAST TWO CENTRAL SHAFTS AND HAVING A PLANETARY GEAR BOX

This application claims priority to German Patent Application DE102021122413.6 filed Aug. 30, 2021, the entirety of which is incorporated by reference herein.

The present disclosure relates to a planetary gear box, in particular a planetary gear box of a gas turbine engine. The present disclosure furthermore relates to a method for operating a planetary gear box and to a gas turbine engine having at least two central shafts and having a planetary gear box.

Planetary gear boxes are configured with bearing units, such as rolling and/or plain bearings, for rotatably mounting planet gears on planet pins of planet carriers. Aside from rolling bearings, plain bearings are the most frequently used type of bearing in the construction of machinery and equipment. In a plain bearing, the two parts that move relative to one another are in direct contact. Said two parts slide on one another counter to the resistance caused by dynamic friction. This can be kept low through the selection of a low-friction material pairing, by lubrication or by the generation of a lubricating film that separates the two contact surfaces from one another. If the two parts come into contact, which is the case in most plain bearings that are used, wear occurs on the contact surfaces, limiting the service life of a plain bearing. In the case of full lubrication, the generation of the separating lubricating film requires additional outlay. The sliding resistance has the effect that a proportion of the kinetic energy is converted into heat energy, which flows into the two bearing parts and may have to be dissipated.

In turbine engines, use is often made of plain bearings, between the partners of which the sliding resistance results from fluid friction. The desired lubricating film in the bearing gap must be pressurized in order that it can separate the contact surfaces from one another counter to the bearing force. In the case of hydrostatic plain bearings, an oil pump is used for this purpose. By contrast, in the case of so-called hydrodynamic plain bearings, the oil pressure in the lubricating film is produced by the contact surfaces themselves as they move relative to one another.

In the case of gear boxes that are used in gas turbine engines of aircraft, high demands are placed on plain bearings and rolling bearings owing to the limited available oil quantity and the high operating temperatures. In addition, a total weight of a gas turbine engine should be as low as possible. It is fundamentally sought to achieve as low as possible a likelihood of failure of plain and rolling bearings.

For this purpose, plain and/or rolling bearings that are provided between a planet gear and a planet pin of a rotatable planet carrier are charged with oil via two mutually separate oil feeds. Owing to the redundant oil supply of such a plain and/or rolling bearing, it is possible, even in the event of a malfunction of one of the oil feeds, for the plain and/or rolling bearing to still be charged with oil via the respective other oil feed.

In order to prevent an impairment of the service life of a plain and/or rolling bearing as a result of an ingress of dirt particles into the bearing gap and resulting high likelihood of failure, the oil feeds have oil filters. In the case of so-called closed oil feeds, which are in each case configured to be pressure-tight between a plain and/or rolling bearing and a pressure side of an oil pump, no dirt can ingress in the feed region of the oil between the oil pump and a bearing. It is thus possible for an oil filter of a closed oil feed to be arranged in that region of a gas turbine engine which is easily accessible during an inspection or servicing of a gas turbine engine. It is then possible to perform a functional inspection of the oil filter and an exchange of the oil filter if it is contaminated.

By contrast, dirt can ingress into a so-called open oil feed into which oil is introduced in a substantially unpressurized state through an opening of the open oil feed. It is therefore necessary for an oil filter to be arranged in a region of the open oil feed downstream of the opening, which is thus difficult to access. An inspection and an exchange of the oil filter are then possible only with considerable installation effort, resulting in high servicing costs or an increased likelihood of failure because the oil filters of open oil feeds cannot be appropriately serviced and exchanged.

The present disclosure is therefore based on the object of providing a planetary gear box and a gas turbine engine which are each distinguished by low servicing costs and by a low likelihood of failure. The present disclosure is furthermore based on the object of creating a method for operating a planetary gear box having at least one planet gear, with which method a planetary gear box can be operated inexpensively over as long an operating period as possible.

This object is achieved by a planetary gear box, a gas turbine engine and a method having features as disclosed herein. Advantageous refinements are also disclosed herein.

A planetary gear box, in particular a planetary gear box of a gas turbine engine, having at least one planet gear which, by means of a bearing unit, is arranged rotatably on a planet pin of a rotatable planet carrier, is proposed. The planet carrier is connected rotationally fixedly to the planet pin. Oil can be introduced through an opening, which is arranged radially within the bearing unit, into an oil feed which is open at a feed side and which is connected fluidically to the bearing unit and rotationally conjointly to the planet carrier. Downstream of the opening in the open oil feed, and as the planet carrier rotates, the oil is conducted in the direction of the bearing unit by the centrifugal force that then acts.

The open oil feed is, between the opening and the bearing unit, configured with at least one oil filter through which the oil is conducted between the opening and the bearing unit. The oil filter at least regionally extends, counter to the flow direction of the oil from the opening in the direction of the bearing unit, into the flow path of the oil in the open oil feed.

It is thus ensured in a simple manner in terms of construction that dirt particles that have been filtered out of the oil by the oil filter do not remain on the outside of the oil filter, which faces toward the opening of the open oil feed. The dirt particles are guided at least partially along the outside of the oil filter by the oil flow in the open oil feed, and said dirt particles are deposited in a region of the oil filter which faces away from the opening of the open oil feed. Blockage or clogging of the oil filter by filtered-out dirt particles from the oil is thus prevented over as long an operating period as possible. This promotes a supply of oil to the bearing unit via the open oil feed, and reduces the likelihood of failure in relation to known bearing units.

The arrangement of the oil filter in the open oil feed, and the fact that the oil filter extends, counter to the flow direction of the oil in the open oil feed, from the opening in the direction of the bearing unit and thus radially inward, offer the possibility of utilizing centrifugal force for the transport of dirt particles. The dirt particles that had been filtered out of the oil in the region of the oil filter are then guided by centrifugal force along the outside of the oil filter into a volume within the open oil feed, which volume lies further to the outside in the direction of the radially outwardly acting centrifugal force, and thus radially, than extensive regions of the oil filter. In comparison with existing planetary gear boxes, this dirt accumulating volume offers the possibility of accommodating a large quantity of dirt without the oil filter becoming clogged.

It is decisive here that the oil filter has regions which are provided at smaller radii of the planetary gear box and of the open oil feed than the volume that is provided within the open oil feed for accommodating dirt.

It is additionally conducive to this if the filtered-out dirt particles are guided along the outside of the oil filter in the direction of said volume. For this purpose, an oil filter may be provided which is oriented not entirely perpendicularly with respect to the centrifugal force.

The bearing unit may comprise at least one plain bearing and/or at least one rolling bearing.

The open oil feed may comprise a channel which extends in a circumferential direction and which is connected to the planet carrier. The channel may be configured to be radially inwardly open in the region of the opening of the open oil feed, wherein the oil filter is provided in the channel. In this embodiment of the planetary gear box according to the present disclosure, the oil can be easily sprayed or injected radially outward into the channel from an oil feed unit. In the channel, as the planet carrier rotates, the introduced oil is conducted in the direction of the oil filter and through the oil filter by the centrifugal force that then acts. Dirt particles entrained in the oil are filtered out in the region of the oil filter and are accumulated in a volume that is delimited by the channel and the oil filter upstream of the oil filter.

Downstream of the oil filter, the oil is conducted from a radially outer channel region of the channel in the direction of the bearing unit if the centrifugal force respectively acting on the oil is high enough for this purpose.

The oil filter may, in a filter section that faces toward the radially outer channel region, be fixedly connected to delimiting walls of the channel. Additionally, the oil filter may comprise a further filter section which extends radially inward from the filter section into the interior of the channel and through which the oil in the channel can flow. The further filter section may be at least regionally configured to run in the interior of the channel in a manner spaced apart from at least one of the delimiting walls of the channel. Dirt particles that have been filtered out by the oil filter can then, to the desired degree, be guided radially outward in the channel in the direction of the filter section and accumulated and retained there, without clogging the further filter section and impeding a flow of the oil through the further filter section to an undesired degree or preventing such a flow entirely.

In a structurally simple embodiment of the planetary gear box according to the present disclosure, the filter section may be configured as a cylindrical partition which extends in the channel in a circumferential direction and in an axial direction of the channel and which is connected to the lateral delimiting walls of the channel.

The partition may be configured with multiple passage openings which are spaced apart from one another in a circumferential direction of the channel and in the region of which there is provided in each case one further filter section. As large as possible a collecting volume for dirt particles is then provided upstream of the bearing unit and upstream of the oil filter, which prevents clogging of the oil filter with little outlay.

The at least one further filter section may be configured as a hollow cylindrical body composed of filter material.

It is additionally also possible for the further filter section to be of conical configuration. Here, the filter section may be connected, in the region of its base surface, to the partition and extend radially inward away from the partition in the direction of the open region of the channel.

Both the hollow cylindrical and the conical configuration of the further filter section are conducive, to a desired degree, to discharging filtered-out dirt particles radially outward along the further filter section with the aid of centrifugal force, and preventing clogging of the filter to a desired degree.

The radially outer channel region may be connected to a line which runs at least regionally in an axial direction in the planet pin and which is connected to a further line which opens out in the bearing unit. The oil can then be fed to the bearing unit with little manufacturing outlay.

In a further embodiment of the planetary gear box according to the present disclosure, a further line of a closed oil feed opens out into the bearing unit. Via the line, oil can be fed from an additional line, which runs in the planet pin, of the closed oil feed to the bearing unit. By means of the planetary gear box, the bearing unit can then be supplied with oil via a redundant oil feed, as a result of which a likelihood of failure of the bearing unit and thus of the planetary gear box is low even in the event of a failure of the oil supply via the open oil feed.

In a further embodiment of the planetary gear box according to the present disclosure, the additional line of the closed oil feed is fluidically connected to an oil line running in the planet carrier. The connecting region between the additional line and the oil line is sealed off with respect to the surroundings of the planetary gear box, whereby, when the planet carrier is stationary or rotating only slowly, oil can be introduced under pressure into the oil feed pocket and thus into the bearing unit.

Also proposed is a gas turbine engine having at least two central shafts and having a planetary gear box with at least one planet gear. The planet gear is, by means of a bearing unit, arranged rotatably on a planet pin of a rotatable planet carrier, wherein the planet pin is connected rotationally fixedly to the planet carrier. Oil can be introduced via an open oil feed and via a closed oil feed into the bearing unit. The oil feeds are connected fluidically to the bearing unit and rotationally conjointly to the planet carrier.

As the planet carrier rotates, the oil downstream of an opening of the open oil feed for the oil is conducted in the open oil feed in the direction of the bearing unit by the centrifugal force acting on the oil. Here, the open oil feed is, between the opening and the bearing unit, configured with at least one oil filter through which the oil is conducted between the opening and the bearing unit.

The first central shaft is configured to be operated at a higher rotational speed than the second central shaft during operation. The second central shaft is coupled to the planetary gear box. The closed oil feed of the planet carrier is connected to a pressure side of an oil pump, the drive shaft of which is connected to the first central shaft. An oil feed unit is furthermore provided, from which oil is introduced into the open oil feed.

The gas turbine engine according to the present disclosure comprises a combination of two oil feeds or feed lines of a high-performance gear box which is arranged in a power flow of a low-pressure turbine region. The first feed line or the closed oil feed provides a sealed-off and thus closed oil transfer in order to pump oil to oil consumers of the planetary gear box, that is to say in the present case to the bearing unit of the planetary gear box. Since the first oil feed line constitutes a closed system, an oil filter of the closed oil feed can be arranged upstream of the oil feed into the planetary gear box. The oil filter of the closed oil feed is thus accessible and can be serviced.

The second feed line or the open oil feed constitutes a device that comprises an oil filter that is arranged in an open system. In the case of such an open oil feed, the oil can be introduced, that is to say injected or sprayed, into a channel or a groove by way of oil jets. The centrifugal force acting on the oil in the channel causes a centrifugal pumping effect and pumps the oil to oil consumers or to the bearing unit of the planetary gear box, which may comprise at least one plain bearing and/or at least one rolling bearing.

The different type of oil feed is significantly conducive to reducing the likelihood of failure of the bearing unit, because the possibility of a complete stoppage of the oil supply is low.

Since dirt can enter the rotating system via the open oil feed, the oil filter of the open oil feed must be integrated into the rotating system and thus into the rotating region of the planetary gear box. This impedes or prevents the possibility of servicing the oil filter.

In the case of the gas turbine engine according to the present disclosure, during starting operations of the gas turbine engine and in the presence of low rotational speeds of the central shafts, dirt can be flushed out of the oil filter of the open oil feed. The closed oil feed can be utilized for this purpose, which, during a starting operation of the gas turbine engine and in the presence of low rotational speeds of the central shafts and thus of the gas turbine engine, introduces an oil volume flow sufficient for this into the bearing unit.

This is made possible by the fact that the oil pump of the closed oil feed is connected to and driven by the first central shaft, which is operated in each case at a higher rotational speed than the second central shaft. It is also the case during starting operations that the first central shaft has a higher rotational speed than the second central shaft. Therefore, during the start-up of the gas turbine engine according to the present disclosure, the oil pump of the closed oil feed is driven at a sufficient rotational speed and introduces a desired high oil volume flow into the bearing unit.

Since the transport of oil in the open oil feed is dependent on the centrifugal force respectively acting on the oil, the centrifugal force during start-up operations of the gas turbine engine and in the presence of low rotational speeds of the gas turbine engine is not high enough to conduct oil to the bearing unit via the open oil feed. The closed oil feed and the open oil feed are connected to one another in the region of the oil consumer of the planetary gear box, that is to say in the present case in the region of the bearing unit of the plain bearing.

If the oil pressure in the region of the bearing unit is high enough, oil is introduced from the region of the bearing unit into the open oil feed and is conducted in the direction of the opening of the open oil feed. This causes a flow through the oil filter in the open oil feed in a direction opposite to the flow direction of the oil if the centrifugal force pumps the oil in the open oil feed in the direction of the bearing unit. Dirt deposits in the region of the oil filter are then washed out. The self-cleaning of the oil filter that occurs here effectively counteracts clogging of the filter over the operating period of a gas turbine engine in a simple manner, whereby an oil supply to the bearing unit is permanently ensured via the open oil feed, too, without the need to service the oil filter.

The oil feed unit that is assigned to the open oil feed may be driven by the first central shaft and/or by the second central shaft.

Additionally proposed is a method for operating a planetary gear box having at least one planet gear, which, by means of a bearing unit that may comprise at least one plain bearing and/or at least one rolling bearing, is arranged rotatably on a planet pin of a rotatable planet carrier. The bearing unit is, during the operation of the planetary gear box, charged with oil from a closed oil feed. In the presence of a rotational speed of the planet carrier higher than a threshold value, oil flows through an oil feed, which is open at a feed side, and an oil filter of the open oil feed in the direction of the bearing unit. Additionally, in the presence of rotational speeds of the planet carrier lower than the threshold value, oil flows through the open oil feed and the oil filter proceeding from the bearing unit.

It is thus ensured in a simple manner that the bearing unit of the planetary gear box is charged with oil both from the closed oil feed and from the open oil feed in the presence of relatively high rotational speeds of the planet carrier. By means of the method according to the present disclosure, it is additionally achieved that, in the presence of relatively low rotational speeds, that is to say in this case in the presence of rotational speeds lower than the rotational speed threshold, the bearing unit is charged with oil from the closed oil feed, and oil additionally flows through the open oil feed counter to the flow direction of the oil exhibited by the oil in the open oil feed if the bearing unit is charged with oil from the open oil feed, and in the process the oil filter is cleaned or washed.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

The present disclosure is not restricted to the indicated combination of features of the additional independent claims or claims dependent thereon. There are furthermore possibilities of combining individual features, including those which emerge from the claims, the following description of embodiments and directly from the drawing, with one another. The reference to the drawings by the claims through the use of reference designations is not intended to restrict the scope of protection of the claims.

Preferred refinements emerge from the dependent claims and the description hereunder. Exemplary embodiments of the subject matter according to the present invention are explained in greater detail with reference to the drawing, without being restricted thereto. In the drawing:

Figure 4:
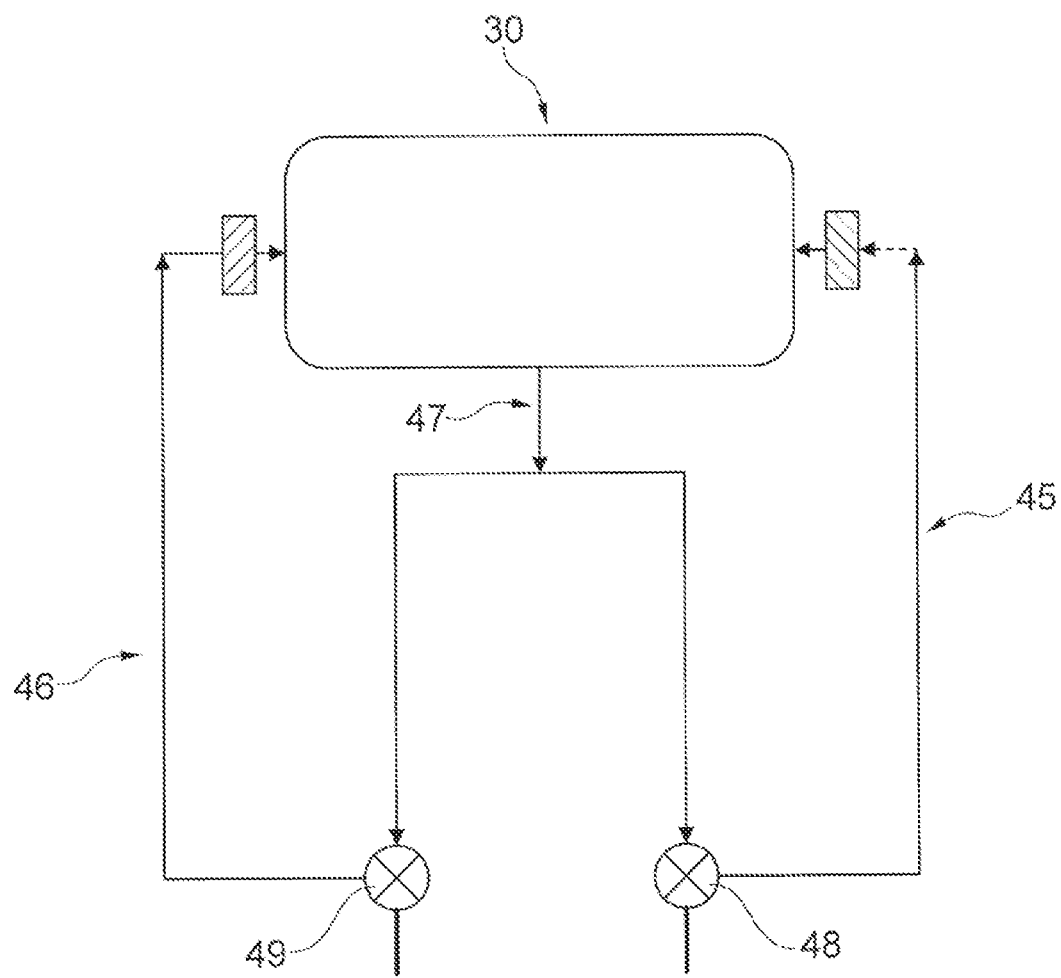
FIG. 4 shows a highly simplified illustration of a gear box of a gas turbine engine that can be supplied with oil via a closed oil feed and an open oil feed.
Figure 5:
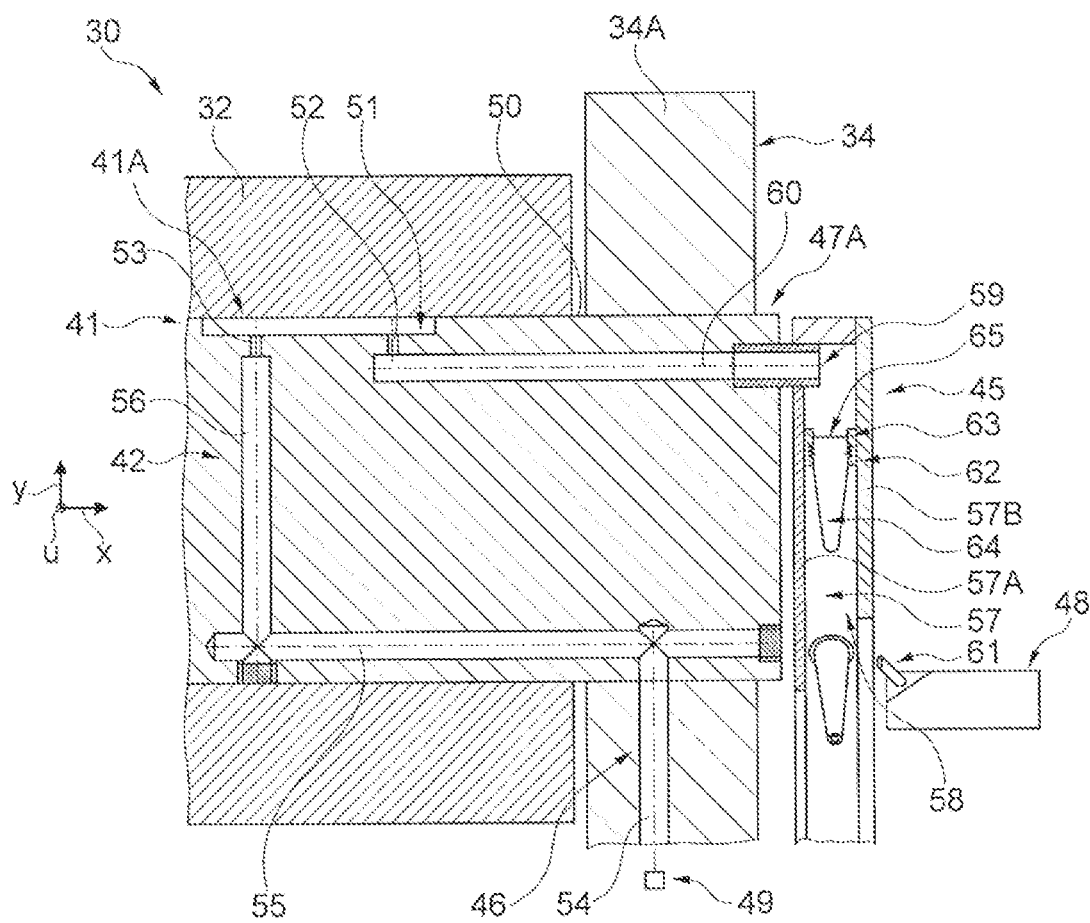
FIG. 5 shows a partial longitudinal sectional view of the gear box according to FIG. 4, showing regions of the closed oil feed and of the open oil feed via which a bearing unit can be supplied with oil, which gear box comprises a plain bearing.
Figure 7:
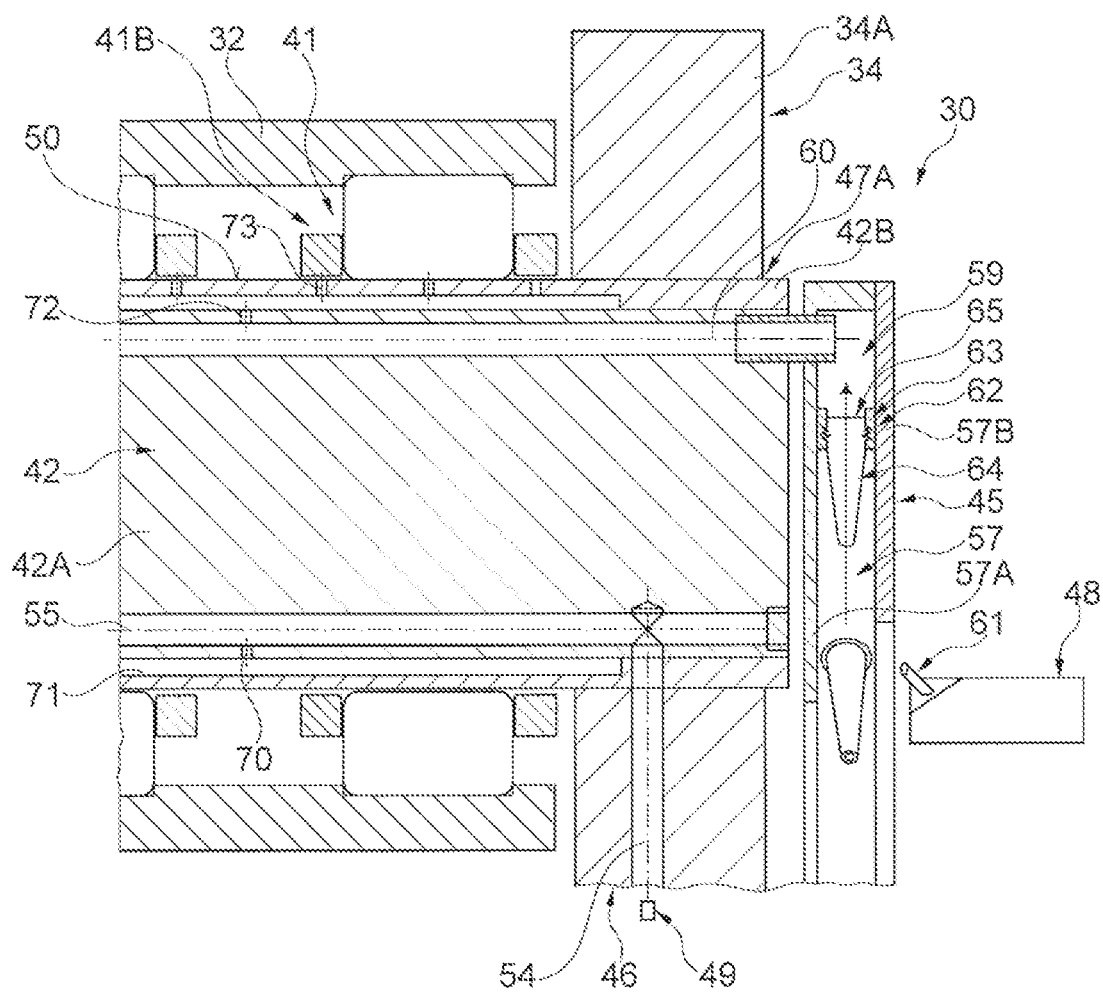
FIG. 7 shows a partial longitudinal sectional view of the gear box according to FIG. 4, showing regions of the closed oil feed and of the open oil feed via which a bearing unit can be supplied with oil, which gear box comprises a rolling bearing.
Figure 8:
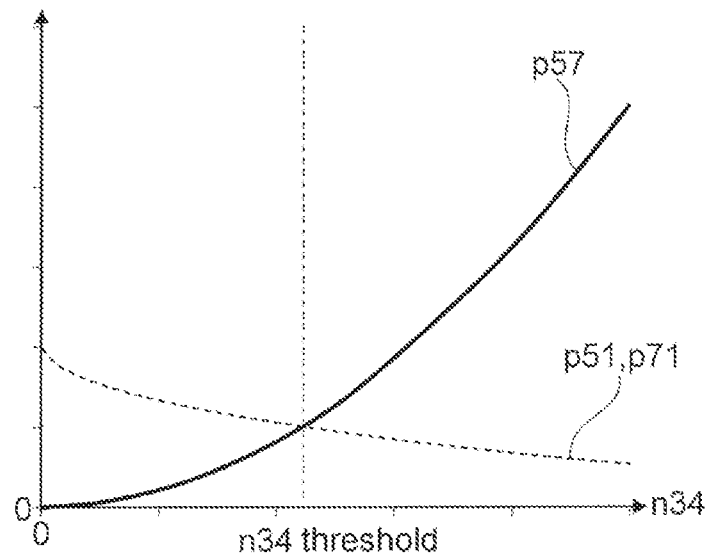
Figure 9:
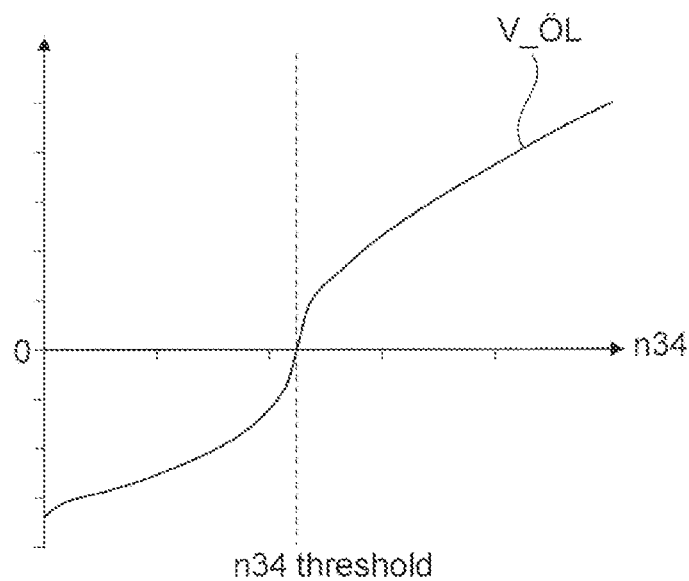

FIG. 8 shows a profile of an oil pressure in the bearing unit of the gear box according to FIG. 5 and according to FIG. 7 respectively, and a profile of an oil pressure in the open oil feed versus the rotational speed of a planet carrier of the gear box, which is configured as a planetary gear box; and FIG. 9 shows a profile of an oil volume flow between the bearing unit according to FIG. 5 and according to FIG. 7 respectively and an opening of the open oil feed versus the rotational speed of a planet carrier of the gear box according to FIG. 4.

Figure 1:
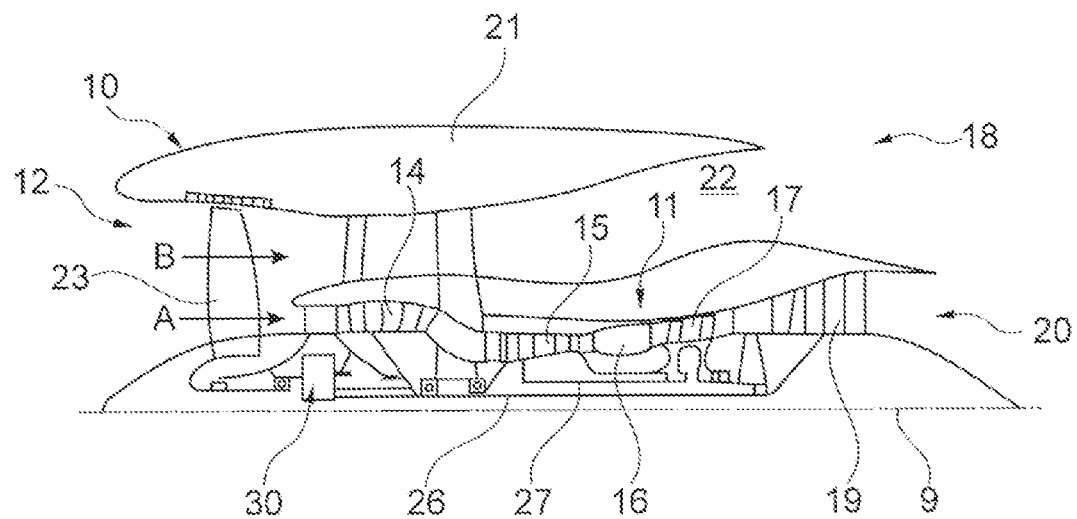
FIG. 1 shows a schematic longitudinal sectional view of a gas turbine engine.

FIG. 1 illustrates a gas turbine engine 10 having a main axis of rotation 9. The engine 10 comprises an air inlet 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gear box 30. The shaft 26 is also referred to here as the core shaft.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and low-pressure turbines 17, 19 and thereby drive said turbines, before being expelled through the nozzle 20 to provide a certain thrust force. The high-pressure turbine 17 drives the high-pressure compressor 15 by way of a suitable connecting shaft 27, which is also referred to as the core shaft. The fan 23 generally provides the major part of the thrust force. The epicyclic gear box 30 is a reduction gear box.

Figure 2:
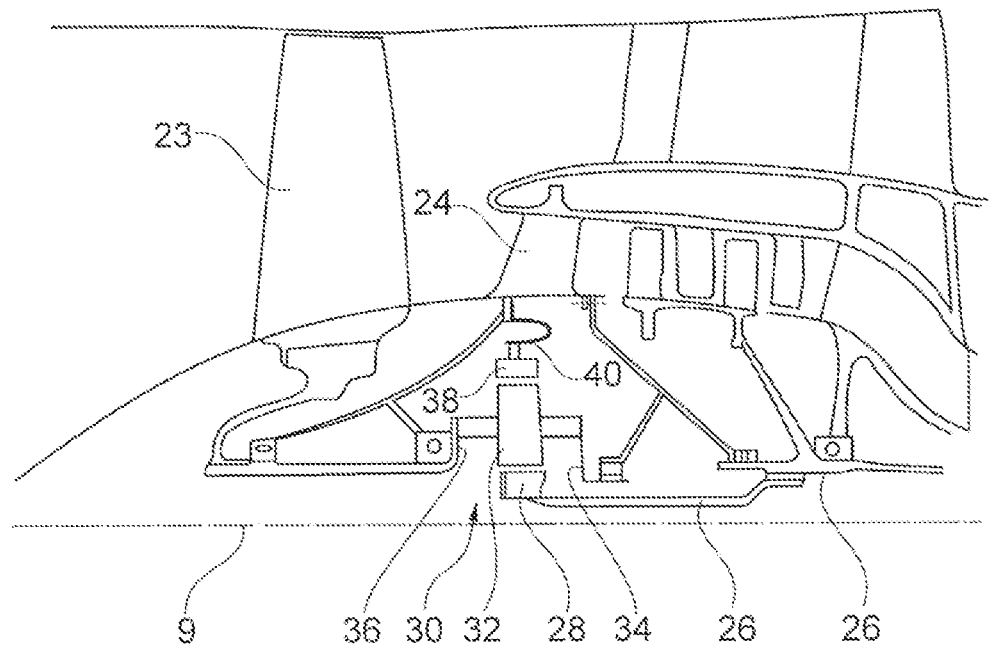
FIG. 2 shows an enlarged partial longitudinal sectional view of an upstream section of a gas turbine engine.

An exemplary arrangement for a geared-fan gas turbine engine 10 is shown in FIG. 2. The low-pressure turbine 19 (see FIG. 1) drives the shaft 26, which is coupled to a sun gear 28 of the epicyclic gear box arrangement 30. Multiple planet gears 32, which are coupled to one another by means of a planet carrier 34, are situated radially to the outside of the sun gear 28 and mesh with the latter and are arranged in each case rotatably on carrier elements or planet pins 42, which are connected rotationally fixedly to the planet carrier 34 and which are shown in more detail in FIG. 3. The planet carrier 34 limits the planet gears 32 to orbiting about the sun gear 28 in a synchronous manner while enabling each planet gear 32 to rotate about its own axis on the planet pins 42, which represent static axes. The planet carrier 34 is coupled by way of linkages 36 to the fan 23 so as to drive the rotation of the latter about the engine axis 9. Radially to the outside of the planet gears 32 and meshing therewith is an annulus or ring gear 38 that is coupled, via linkages 40, to a stationary support structure 24.

It is noted that the terms "low-pressure turbine" and "low-pressure compressor" as used herein can be taken to mean the lowest-pressure turbine stage and the lowest-pressure compressor stage (that is to say not including the fan 23) respectively and/or the turbine and compressor stages that are connected to one another by the connecting shaft 26 with the lowest rotational speed in the engine (that is to say not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
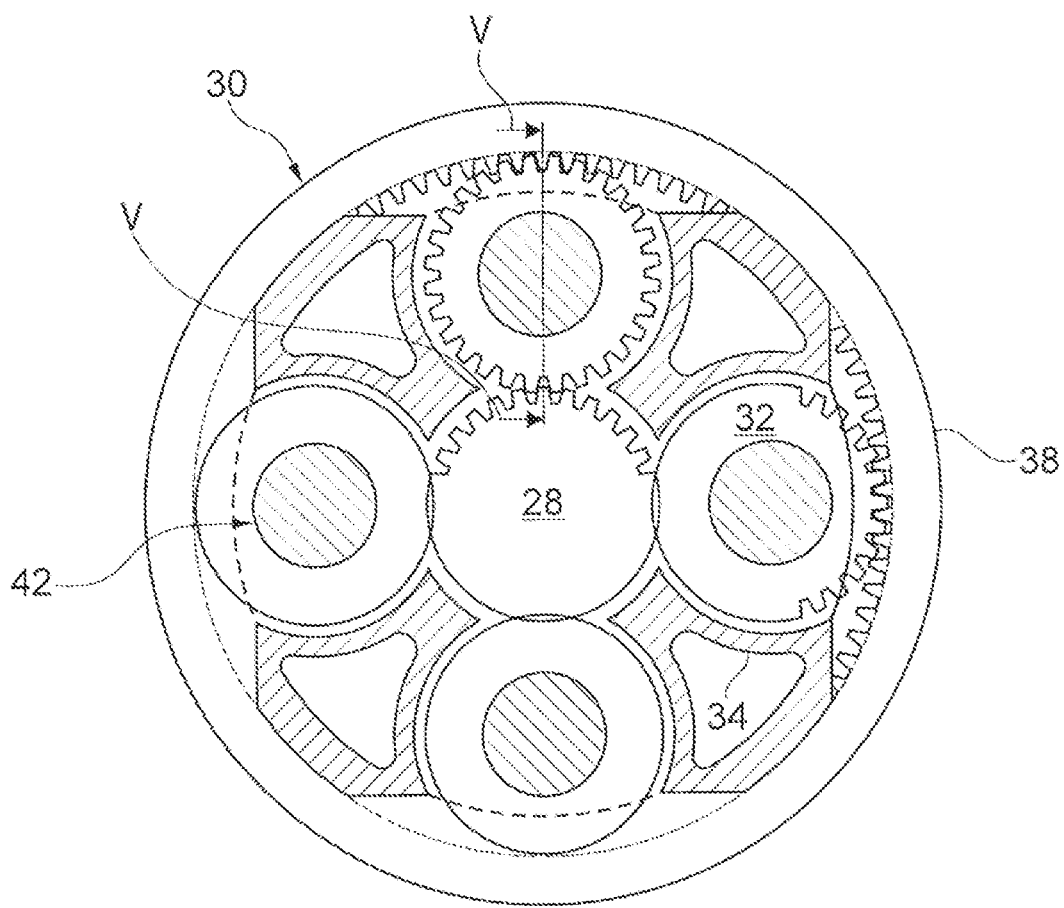
FIG. 3 shows an isolated illustration of a gear box for a gas turbine engine.

The epicyclic gear box 30 is shown in greater detail by way of example in FIG. 3. Each of the sun gear 28, the planet gears 32 and the ring gear 38 comprise teeth about their periphery for meshing with the other toothed gears. However, for clarity, only exemplary portions of the teeth are illustrated in FIG. 3. Although four planet gears 32 are illustrated, it will be apparent to the person skilled in the art that more or fewer planet gears 32 may be provided within the scope of protection of the claimed invention. Practical applications of an epicyclic gear box 30 generally comprise at least three planet gears 32.

The epicyclic gear box 30 illustrated by way of example in FIGS. 2 and 3 is a planetary gear box, in which the planet carrier 34 is coupled to an output shaft via linkages 36, wherein the ring gear 38 is fixed. However, any other suitable type of epicyclic gear box 30 may be used. As a further example, the epicyclic gear box 30 may be a star arrangement, in which the planet carrier 34 is held fixed, with the ring gear (or annulus) 38 being allowed to rotate. In the case of such an arrangement, the fan 23 is driven by the ring gear 38. As a further alternative example, the gear box 30 may be a differential gear box in which both the ring gear 38 and the planet carrier 34 are allowed to rotate.

The geometry of the gas turbine engine 10, and components thereof, is or are defined using a conventional axis system which comprises an axial direction X (which is aligned with the axis of rotation 9), a radial direction Y (in the direction from bottom to top in FIG. 1), and a circumferential direction U (perpendicular to the view in FIG. 1). The axial, radial and circumferential directions X, Y and U are mutually perpendicular.

FIG. 4 shows the planetary gear box 30 of the gas turbine engine 10 in a simplified view. The planetary gear box 30 can be supplied with oil via an open oil feed 45. Provision may additionally be made for oil to also be fed to the planetary gear box 30 via a closed oil feed 46. The oil fed to the planetary gear box 30 in each case is recirculated into an oil system of the gas turbine engine 10 again via a return line 47 of the planetary gear box 30, and is introduced from there into the oil feeds 45 and 46 respectively by means of oil pumps 48, 49. Here, the oil pumps 48 and 49 may for example be driven by the connecting shaft 27 of the gas turbine engine 10 according to FIG. 1.

FIG. 5 shows a partial longitudinal sectional view of the planetary gear box 30 along a section line V-V indicated in more detail in FIG. 3. The planet carrier 34 comprises two webs 34A which are spaced apart from one another in an axial direction X and of which only one of the two webs 34A is illustrated in FIG. 5. The planet pin 42 is, at the ends, arranged rotationally fixedly in a respective bore 47A of the webs 34A of the planet carrier 34. In the region of an outer side 50, the planet pin 42 is configured with an oil feed pocket 51. The planet pins 42 are each installed in the planet carrier 34 such that the oil feed pockets 51 are each, in a circumferential direction U of the planet pins 42, arranged under all circumstances outside a highly loaded region of bearing units 41 of the planet gears 32, which in the exemplary embodiment of the gear box 30 shown in FIG. 5 comprise plain bearings 41A. The oil feed pockets 51 are in the present case each configured as a milled-away or milled-out portion on the outer sides 50 of the planet pins 42.

A line 52 of the open oil feed 45 opens into the oil feed pocket 51 of the plain bearing 41A as shown in FIG. 5. A line 53 of the closed oil feed 46 additionally also opens into the oil feed pocket 51. Here, oil is introduced in a pressurized state by the oil pump 49 into an oil line 54 of the closed oil feed 46, which in the present case is provided so as to run substantially in a radial direction Y in the planet carrier 34 or in the web 34A. The oil line 54 opens out in an oil feed line 55 which runs substantially in an axial direction X in the planet pin 42 and which in the present case is configured as a blind bore. A further oil feed line 56 branches off from the oil feed line 55 of the closed oil feed 46, which further oil feed line in turn runs in a radial direction Y in the planet pin 42 and is connected to the line 53.

In the present case, the open oil feed 45 comprises a channel 57, which, inwardly in a radial direction Y, is configured with an opening 58. The channel 57 and the opening 58 extend in a circumferential direction U over the entire circumference of the planet carrier 34. Here, the channel 57 is connected rotationally conjointly to the planet carrier 34 and to the planet pin 42. In a radially outer region 59 of the channel 57, the channel 57 is connected to an oil feed line 60 which runs substantially in an axial direction X in the planet pin 42 and which in turn is fluidically connected to the line 52 of the open oil feed 45.

During the operation of the gas turbine engine 10, oil is conducted under pressure by the oil pump 48 to an oil feed unit 61 and is injected via the oil feed unit 61 through the opening 58 into the channel 57. In the channel 57, the injected oil is, in a manner dependent on the rotational speed of the planet carrier 34, guided in the direction of the radially outer region 59 of the groove 57, and introduced into the line 60, by the centrifugal force that then respectively acts on the oil. Here, the oil which is introduced into the channel 57, and which, in the channel 57, is in contact with lateral delimiting walls 57A, 57B of the channel 57, is firstly accelerated in a circumferential direction U by the rotation of the planet carrier 34 and thus also the rotation of the delimiting walls 57A, 57B, and is conducted outward in the channel 57 in a radial direction Y by the centrifugal force that then acts on the oil. In other words, the oil is accelerated in a circumferential direction U of a so-called collecting region or of the channel 57 of the open oil feed 45, and a substantially radial flow in the direction of the radially outer region 59 of the channel or of the collecting region is imposed upon the oil in the channel 57.

In order to prevent an undesired ingress of dirt through the opening 58 into the open oil feed 45, an oil filter 62 is arranged in the channel 57, through which oil filter the oil that is introduced via the opening 58 into the channel 57 is conducted. The oil is purified in the region of the oil filter 62 before being introduced via the radially outer region 59 of the channel 57 into the oil feed line 60.

The oil filter 62 regionally extends in the open oil feed 45, counter to the flow direction of the oil from the opening 58 of the channel 57 in the direction of the oil feed pocket 51 of the bearing unit 41, into the flow path of the oil. Additionally, the oil filter 62 is, in a filter section 63 that faces toward the radially outer channel region 59, fixedly connected to delimiting walls 57A, 57B of the channel 57. From the filter section 63, a further filter section 64 extends radially inward in the channel 57, through which further filter section the oil in the channel 57 can flow and which further filter section is configured to run in the interior of the channel 57 in a manner spaced apart from the delimiting walls 57A, 57B or the side walls of the channel 57.

Figure 6:
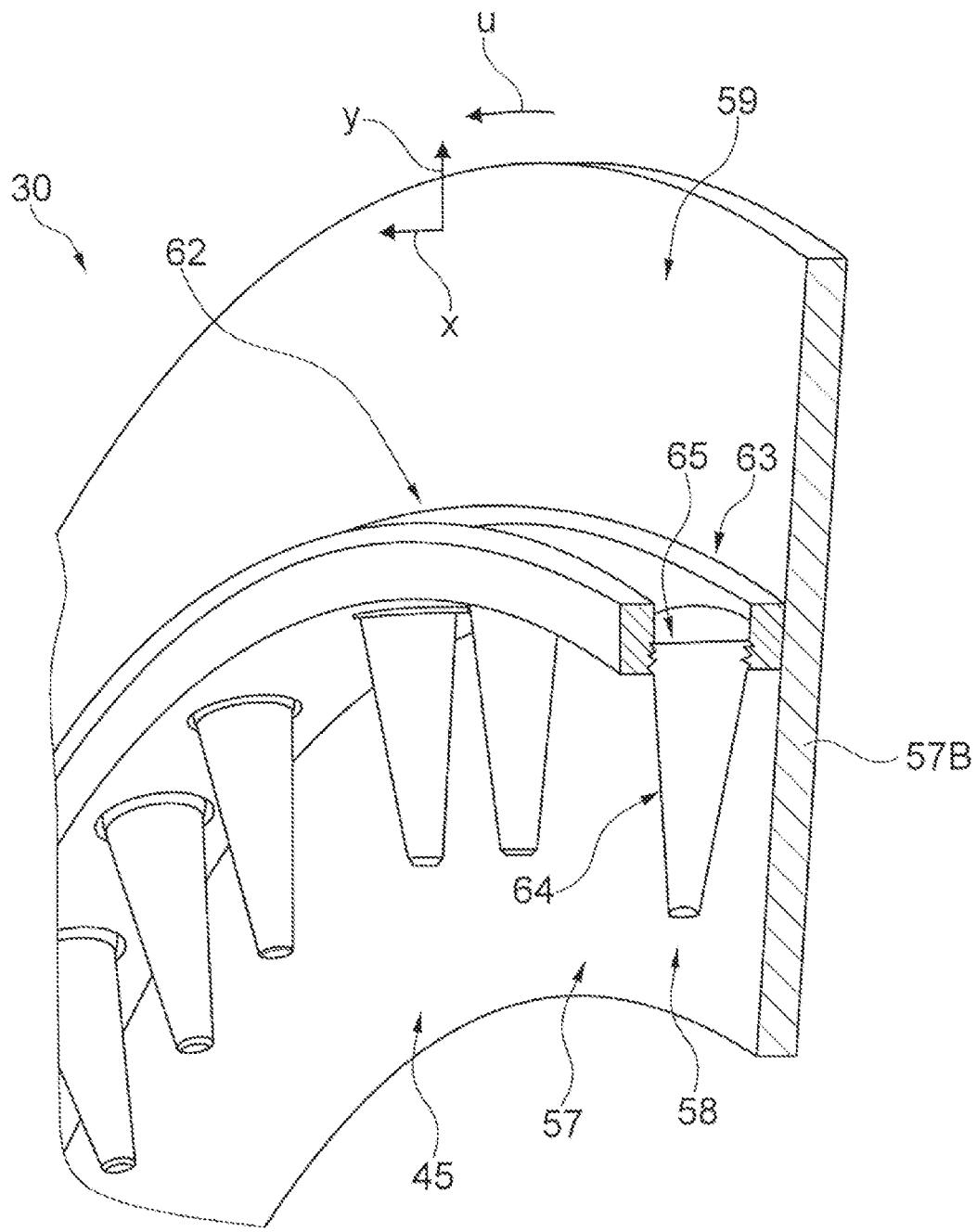
FIG. 6 shows a three-dimensional partial view of the open oil feed of the gear box according to FIG. 4.

The filter section 63 is, in the manner illustrated in more detail in FIG. 6, configured as a cylindrical partition which extends in the channel 57 in a circumferential direction U and in an axial direction X of the channel 57 and which is connected to the lateral delimiting walls 57A, 57B of the channel 57. Additionally, the partition 63 is configured with multiple passage openings 65 which are spaced apart from one another in a circumferential direction U of the channel 57 and in the region of which there is provided in each case one further filter section 64. The further filter sections 64 are each of conical or pylon-shaped configuration in the manner illustrated in more detail in FIG. 6. Furthermore, the further filter sections 64 are each connected, in the region of their base surfaces, to the partition 63 and extend radially inward away from the partition 63 in the direction of the open region of the channel 57.

The above-described configuration of the oil filter 62 prevents complete clogging of the oil filter 62 by filtered-out dirt particles in a structurally simple manner. This is the case because, during the operation of the gas turbine engine 10 and thus of the planetary gear box 30, the dirt particles slide in a radially outward direction down the steep walls of the conically configured further filter sections 64 owing to the centrifugal force that then acts. The dirt particles accumulate and remain downstream of the opening 58 on that side of the partition 63 which faces toward the opening 58, without clogging or closing the further filter sections 64.

For the dirt particles that have been centrifuged in the direction of the partition 63, a volume in which the dirt particles are collected and accumulated without significantly influencing the flow resistance for the oil in the region of the oil filter 62 is provided in the interior of the channel 57, which volume extends in a circumferential direction U, in a radial direction Y and in an axial direction X between the further filter sections 64 and is relatively large. By means of the further filter sections 64 which each project radially inward, it is additionally ensured that, even in the presence of a certain layer thickness of the dirt particles proceeding from the radial inner side of the partition 63 and inwardly in a radial direction X of the channel 57, the oil can, as before, flow substantially unimpeded through the oil filter 62.

As already mentioned briefly above, it is possible for the plain bearing 41A of the bearing unit 41 or the oil feed pocket 51 to be charged with oil via the closed oil feed 46 in addition to the open oil feed 45. Owing to the closed or sealed configuration of the closed oil feed 46, filtering of the oil that is fed via the closed oil feed 46 can take place at any location outside the planetary gear box 30. Here, the oil filter of the closed oil feed 46 is arranged downstream of the oil pump 49.

Additionally, the redundant oil feed into the plain bearing 41A via the closed oil feed 46 makes it possible for the plain bearing 41A to be charged with oil even in the presence of low rotational speeds of the planet carrier 34. This is advantageous because, in the presence of low rotational speeds of the planet carrier 34, that is to say below a defined rotational speed threshold, the centrifugal force that acts on the oil in the channel 57 as the planet carrier 34 rotates is not yet sufficient to charge the plain bearing 41A with oil to the required degree via the open oil feed 45.

If the oil is introduced at a correspondingly high pressure into the oil feed pocket 51 via the closed oil feed 46, at least a proportion of the oil that is introduced into the oil feed pocket 51 via the closed oil feed 46 is introduced via the line 52 and the oil feed line 60 into the radially outer channel region 59. The oil is subsequently conducted through the oil filter 62 in the direction of the opening 58 of the channel 57. Thus, in the operating state of the planetary gear box 30 and of the gas turbine engine 10 as described immediately above, oil flows through the oil filter 62 in a direction such that dirt particles adhering to the outside of the further filter sections 64 are washed out of the oil filter and are discharged from the channel 57.

Such an operating state of the gas turbine engine 10 in which the planet carrier 34 is operated only at low rotational speeds arises in particular during starting operations of the gas turbine engine 10, during which the connecting shaft 27, which constitutes a so-called high-pressure shaft of the gas turbine engine 10, rotates at a higher rotational speed than the so-called low-pressure shaft 26 of the gas turbine engine 10, which is rotationally connected to the planetary gear box 30.

This means that the oil pump 49, which is preferably configured as a fixed displacement pump, the delivery volume of which increases linearly with the drive rotational speed, conducts an oil volume in the direction of the oil feed pocket 51 via the closed oil feed 46, which oil volume is sufficient for providing a supply to the plain bearing 41 and for correspondingly flushing and cleaning the oil filter 62.

FIG. 7 shows a partial longitudinal sectional view, corresponding to FIG. 5, of a further embodiment of the planetary gear box 30 along the section line V-V indicated in more detail in FIG. 3. The planetary gear box 30 according to FIG. 7 differs from the planetary gear box 30 according to FIG. 5 only in partial regions, for which reason reference is made to the above description relating to FIG. 5 and FIG. 6 with regard to the basic functioning of the planetary gear box 30 according to FIG. 7, and substantially only the differences between the planetary gear box 30 according to FIG. 5 and the planetary gear box 30 according to FIG. 7 will be discussed in more detail below. Furthermore, in the description that follows with regard to FIG. 7, for components of the planetary gear box 30 according to FIG. 7 that are identical in terms of construction and function, the same reference designations will be used as in the description of the planetary gear box 30 according to FIG. 5.

The bearing unit 41 of the planetary gear box 30 according to FIG. 7 comprises a rolling bearing 41B, which is supplied with oil via the open oil feed 45 and the closed oil feed 46 substantially in the manner described above. The oil line 54 of the closed oil feed 46 opens into the oil feed line 55, which runs in an axial direction X in a pin 42A of the planet pin 42. The pin 42A has been inserted into a sleeve 42B of the planet pin 42 and connected rotationally fixedly thereto. The sleeve 42B is additionally operatively connected rotationally fixedly to the planet carrier 34. The oil feed line 55 is connected via a radial bore 70 to an annular space 71 that extends in a circumferential direction U in the planet pin 42. In the embodiment of the planetary gear box 30 illustrated in FIG. 7, the annular space 71 is provided between the sleeve 42B of the planet pin 42 and the pin 42A of the planet pin 42 and is delimited by these in a radial direction Y and in an axial direction X.

The annular space 71 is additionally connected via a further radial bore 72 to the oil feed line 60 of the open oil feed 45. The oil feed line 60 runs in an axial direction X in the pin 42A. Furthermore, the annular space 71 is connected via additional radial bores 73, which are provided in the sleeve 42B, to the bearing gap of the rolling bearing 41B, wherein the rolling bearing 41B can be charged with oil from the annular space 71 via the additional radial bores 73.

During the operation of the gas turbine engine 10, oil is, in the manner described above, conducted under pressure by the oil pump 48 to the oil feed unit 61 and injected via the oil feed unit 61 through the opening 58 into the channel 57. In the channel 57, the injected oil is, in a manner dependent on the rotational speed of the planet carrier 34, guided in the direction of the radially outer region 59 of the groove 57, and introduced into the line 60, by the centrifugal force that then respectively acts on the oil. In order to prevent an undesired ingress of dirt through the opening 58 into the open oil feed 45, the oil filter 62 is arranged in the channel 57, which oil filter is configured as in the planetary gear box 30 according to FIG. 5.

If the oil is introduced at a correspondingly high pressure into the annular space 71 via the closed oil feed 46, at least a proportion of the oil that flows into the annular space 71 via the closed oil feed 46 is conducted via the further radial bore 72 and the oil feed line 60 into the radially outer channel region 59. The oil subsequently flows through the oil filter 62 in the direction of the opening 58 of the channel 57. Thus, in the operating state of the planetary gear box 30 and of the gas turbine engine 10 as described immediately above, the oil flows through the oil filter 62 in a direction such that dirt particles adhering to the outside of the further filter sections 64 are washed out of the oil filter and are discharged from the channel 57.

Such an operating state of the gas turbine engine 10 in which the planet carrier 34 is operated only at low rotational speeds arises in particular during starting operations of the gas turbine engine 10, during which the connecting shaft 27, which constitutes a so-called high-pressure shaft of the gas turbine engine 10, rotates at a higher rotational speed than the so-called low-pressure shaft 26 of the gas turbine engine 10, which is rotationally connected to the planetary gear box 30.

This means that the oil pump 49, which is preferably configured as a fixed displacement pump, the delivery volume of which increases linearly with the drive rotational speed, conducts an oil volume in the direction of the annular space 71 via the closed oil feed 46, which oil volume is sufficient for providing a supply to the rolling bearing 41B and for correspondingly flushing and cleaning the oil filter 62.

Thus, in the embodiment of the planetary gear box 30 according to FIG. 7, the closed oil feed 46 and the open oil feed 45 are connected to one another via the annular space 71 similarly to the way in which the oil feeds 45 and 46 of the planetary gear box 30 as per FIG. 5 are connected to one another via the oil feed pocket 51, in order to ensure an oil supply to the bearing unit 41 or to the plain bearing 41A or to the rolling bearing 41B.

Additionally, the flow direction of the oil in which flow passes through the oil filter 62 of the planetary gear box 30 according to FIG. 5 and according to FIG. 7, respectively, changes in each case in the same way in a manner dependent on the pressure gradient between the pressure in the oil feed pocket 51 and the pressure in the channel 47 or between the pressure in the annular space 71 and the pressure in the channel 57.

In the presence of a positive pressure gradient, that is to say if the pressure in the channel 57 is higher than the pressure in the oil feed pocket 51 or if the pressure in the channel 57 is higher than the pressure in the annular space 71, then the bearing unit 41 is also charged with oil via the open oil feed 45. By contrast, in the presence of a negative pressure gradient, that is to say if the pressure in the channel 57 is lower than the pressure in the oil feed pocket 51 or if the pressure in the channel 57 is lower than the pressure in the annular space 71, the oil filter 62 is flushed and cleaned by the oil that is conducted out of the oil feed pocket 51 or out of the annular space 71 in the direction of the channel 57.

FIG. 8 shows rotational-speed-dependent profiles of an oil pressure p51 in the oil feed pocket 51 or of an oil pressure p71 in the annular space 71, respectively, and of an oil pressure p57 in the channel 57. Furthermore, FIG. 9 shows a rotational-speed-dependent profile of an oil volume flow V_OIL through the open oil feed 45.

It is apparent from FIG. 8 that, below a threshold value n34 threshold of the rotational speed n34 of the planet carrier 34, the oil pressure p57 in the channel 57 is lower than the pressure p51 in the oil feed pocket 51 or lower than the pressure p71 in the annular space 71, respectively. This has the effect that, below the threshold value n34 threshold of the rotational speed n34 of the planet carrier 34, the oil is conducted out of the oil feed pocket 51 or out of the annular space 71, respectively, in the direction of the opening 59 of the channel 57, and the oil filter 62 is flushed with oil in the manner described above, and cleaning of the oil filter 62 thus takes place. Above the threshold value n34 threshold, the pressure p57 in the channel 57 exceeds the pressure p51 in the oil feed pocket 51 or the pressure p71 in the annular space 71, respectively. This has the effect that oil is introduced into the oil feed pocket 51 or into the annular space 71, respectively, from the opening 58 of the channel 57 and through the oil filter 62 in addition to the oil volume flow from the closed oil feed 46.

According to the illustration in FIG. 9, the oil volume flow V_OIL has a negative sign in the presence of rotational speeds n34 of the planet carrier 34 lower than the threshold value n34 threshold, and has a positive sign in the presence of rotational speeds n34 of the planet carrier 34 higher than the threshold value n34 threshold. This means that, in the presence of rotational speeds n34 lower than the threshold value n34 threshold, oil is introduced from the oil feed pocket 51 or from the annular space 71, respectively, into the channel 57. By contrast, oil is introduced from the channel 57 into the oil feed pocket 51 or into the annular space 71, respectively, if the rotational speed n34 of the planet carrier 34 is higher than the threshold value n34 threshold.

LIST OF REFERENCE DESIGNATIONS

9 Main axis of rotation
10 Gas turbine engine
11 Core
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Thrust fan
24 Support structure
26 Shaft, connecting shaft
27 Connecting shaft
28 Sun gear
30 Gear box, planetary gear box
32 Planet gear
34 Planet carrier
34A Web
36 Linkage
38 Ring gear
40 Linkage
41 Bearing unit
41A Plain bearing
41B Rolling bearing
42 Planet pin
42A Pin of the planet pin
42B Sleeve of the planet pin
45 Open oil feed
46 Closed oil feed
47 Return of the gear box 30
47A Bore of the web
48 Oil pump of the open oil feed
49 Oil pump of the closed oil feed
50 Outer side of the planet pin
51 Oil feed pocket of the plain bearing 41
52 Line of the open oil feed
53 Line of the closed oil feed
54 Oil line of the closed oil feed
55 Oil feed line of the closed oil feed
56 Further oil feed line of the closed oil feed
57 Channel
57A, 57B Delimiting wall of the channel
58 Opening of the channel
59 Radially outer region of the channel
60 Oil feed line of the open oil feed
61 Oil feed unit
62 Oil filter
63 Filter section of the oil filter
64 Further filter section of the oil filter
65 Passage opening
70 Radial bore
71 Annular space
72 Further radial bore
73 Additional radial bore
A Core air flow
B Bypass air flow
n34 Rotational speed of the planet carrier
n34 threshold Threshold value of the rotational speed of the planet carrier
p51 Oil pressure in the oil feed pocket
p57 Oil pressure in the channel
p71 Oil pressure in the annular space
U Circumferential direction
V_OIL Oil volume flow
X Axial direction
Y Radial direction

The invention claimed is:

1. A planetary gear box of a gas turbine engine, comprising:
a planet gear arranged rotatably on a planet pin of a rotatable planet carrier by a bearing unit,
an opening connected to an open oil feed through which oil is introduced, the opening arranged radially within the bearing unit, the open oil feed being open at a feed side, connected fluidically to the bearing unit and connected rotationally conjointly to the planet carrier, wherein, as the planet carrier rotates, the oil downstream of the opening in the open oil feed is conducted in a direction of the bearing unit by an acting centrifugal force, wherein the open oil feed, between the opening and the bearing unit, includes an oil filter through which the oil is conducted between the opening and the bearing unit, and wherein the oil filter at least regionally extends, counter to a flow direction of the oil from the opening in the direction of the bearing unit, into a flow path of the oil in the open oil feed, wherein a radially outer channel region of a channel of the open oil feed is connected to a line which runs at least regionally in an axial direction in the planet pin and which is connected to a further line which opens out in the bearing unit, and wherein a further line of a closed oil feed opens into the bearing unit, via which further line oil from an additional line, which runs in the planet pin, of the closed oil feed is fed to the bearing unit.

2. The planetary gear box according to claim 1, wherein the bearing unit comprises at least one chosen from a plain bearing and a rolling bearing.

3. The planetary gear box according to claim 1, wherein the channel extends in a circumferential direction and is connected to the planet carrier and is configured to be radially inwardly open in a region of the opening of the open oil feed and in which the oil filter is provided.

4. The planetary gear box according to claim 3, wherein the oil is conducted from the radially outer channel region of the channel in the direction of the bearing unit.

5. The planetary gear box according to claim 4, wherein the oil filter is fixedly connected, in a filter section facing toward the radially outer channel region, to delimiting walls of the channel and comprises a further filter section which extends radially inward from the filter section into an interior of the channel and through which the oil in the channel flows and which is at least regionally configured to run in the interior of the channel in a manner spaced apart from at least one of the delimiting walls of the channel.

6. The planetary gear box according to claim 5, wherein the filter section is configured as a cylindrical partition which extends in the channel in a circumferential direction and in an axial direction of the channel and which is connected to the lateral delimiting walls of the channel.

7. The planetary gear box according to claim 6, wherein the partition is configured with multiple passage openings which are spaced apart from one another in the circumferential direction of the channel and in each region of which there is included a further filter section.

8. The planetary gear box according to claim 6, wherein the further filter section is configured as a hollow cylindrical body composed of filter material.

9. The planetary gear box according to claim 6, wherein the further filter section is of conical configuration, wherein the further filter section is connected, in a region of a base surface thereof, to the partition and extends radially inward away from the partition in a direction of an open region of the channel.

10. The planetary gear box according to claim 1, wherein the additional line of the closed oil feed is fluidically connected to an oil line that runs in the planet carrier, wherein a connecting region between the additional line and the oil line is sealed off with respect to surroundings of the planetary gear box.

11. A gas turbine engine comprising:
first and second central shafts,
a planetary gear box including a planet gear arranged rotatably on a planet pin of a rotatable planet carrier by a bearing unit,
wherein oil is introduced via an open oil feed and via a closed oil feed into the bearing unit,
wherein the open and closed oil feeds are connected fluidically to the bearing unit and rotationally conjointly to the planet carrier,
wherein, as the planet carrier rotates, the oil downstream of an opening of the open oil feed for the oil is conducted in the open oil feed in a direction of the bearing unit by a centrifugal force acting on the oil,
wherein the open oil feed, between the opening and the bearing unit, includes at least one oil filter through which the oil is conducted between the opening and the bearing unit,
wherein the first central shaft is configured to be operated at a higher rotational speed than the second central shaft during operation, and the second central shaft is coupled to the planetary gear box,
wherein the closed oil feed is connected to a pressure side of an oil pump, and a drive shaft of the oil pump is connected to the first central shaft,
and wherein an oil feed unit is provided, from which oil is introduced into the open oil feed.

12. The gas turbine engine according to claim 11, wherein the oil feed unit comprises a further oil pump which is driven by at least one chosen from the first central shaft and by the second central shaft.

13. A method for operating a planetary gear box comprising:
providing a planetary gearbox including a planet gear, arranged rotatably on a planet pin of a rotatable planet carrier by a bearing unit,
charging the bearing unit, during operation of the planetary gear box, with oil from a closed oil feed,
flowing oil through an open oil feed, which is open at a feed side, and an oil filter of the open oil feed in a direction of the bearing unit at a rotational speed of the planet carrier higher than a threshold value, and
flowing oil through the open oil feed and the oil filter proceeding from the bearing unit at rotational speeds of the planet carrier lower than the threshold value.

* * * * *